May 4, 1926.

R. S. BURDETTE

METHOD OF CLOSING OPENINGS IN RUBBER PRODUCTS

Original Filed Jan. 6, 1922

INVENTOR
RICHARD S. BURDETTE
BY
ATTORNEY

Patented May 4, 1926.

1,583,571

UNITED STATES PATENT OFFICE.

RICHARD S. BURDETTE, OF AKRON, OHIO, ASSIGNOR TO THE GOODYEAR TIRE AND RUBBER COMPANY, OF AKRON, OHIO, A CORPORATION OF OHIO.

METHOD OF CLOSING OPENINGS IN RUBBER PRODUCTS.

Original application filed January 6, 1922, Serial No. 527,350. Divided and this application filed January 14, 1925. Serial No. 2,293.

*To all whom it may concern:*

Be it known that I, RICHARD S. BURDETTE, a citizen of the United States, and resident of Akron, Ohio, have invented new and useful Improvements in Methods of Closing Openings in Rubber Products, of which the following is a specification, this application being a division of application Serial No. 527,350, filed January 6, 1922.

This invention relates to vulcanizing devices for use in repairing articles that embody rubber, or rubber composition, for instance, such as tires, hose, or other articles possessing similar structural characteristics.

In order to exemplify its use and construction, I have elected to illustrate and describe its applicability in the art of repairing punctures in tire casings for which operation it is specifically adapted.

It is common practice, in repairing punctures in tire casings, to vulcanize a plug, or insert, that is formed of rubber composition in the orifice constituting the puncture. It is, however, extremely difficult, if not impossible under present practices, to distribute the heat throughout the plug or insert in such manner that the walls of the orifice, which, of course, are already vulcanized, are not overcured during vulcanization of the plug, as will be readily understood without further explanation.

The present invention has been designed with the foregoing problem in view and, therefore, contemplates as a primary consideration, the provision of a device adapted to insure proper vulcanization of a plug or insert without injuriously affecting the surrounding of the wall of the orifice by over-vulcanization.

It is also an object of the invention to so apply the heat that it will be diffused uniformly throughout that area of the plug adjacent the wall of the orifice and to secure a consistent expansion, particularly of this area against the walls of the orifice, to thereby attain a proper adhesion between the plug and the wall during vulcanization.

Other objects, such as ease of operation, and simplicity of construction, will appear when the following description is read in conjunction with the accompanying drawings in which.

Figure 1:
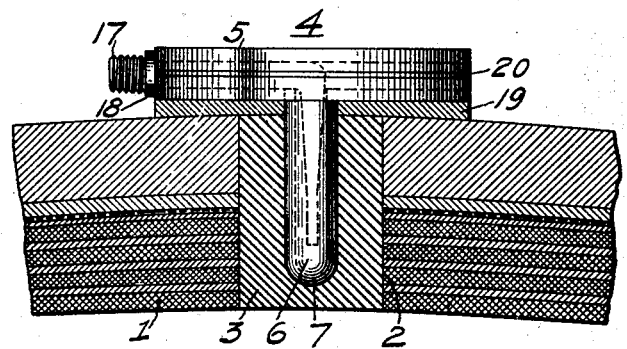
Fig. 1 is a fragmentary sectional view of a portion of a tire casing illustrating the invention in side elevation and its application in repairing a puncture.

Referring to the drawings by characters of reference, the numeral 1 designates a portion of a tire casing, of ordinary construction, which has been cored, as at 2, to receive a conventional form of plug 3, and 4 designates, as a whole, my improved device for vulcanizing the plug in the casing.

The device 4 comprises, generally speaking, a head portion 5 and a shank or hollow nipple portion 6, and is designed to be positioned relative to the plug 3 in substantially the manner illustrated in the drawings, that is to say, with the shank or nipple portion 6 inserted in the plug 3 in a position axially thereof. To permit of its being so positioned, the end of the shank or nipple 6 is tapered or rounded as at 7. In actual practice, the nipple may be positioned in the plug 3 either before or after the plug has been inserted in the puncture orifice. The device 5 may be formed in any suitable manner but preferably it comprises a disk-like flange 8 carrying the aforesaid shank or nipple 6, which is capped by a similarly shaped plate 9 removably fastened thereto through the medium of screws 10. The flange 8 and the plate 9 are respectively provided with diametrical channels $10^a$ and 11 which are designed to register when the device is assembled to form a bore 12 that is in communication with a similar bore 13 in the hollow shank or nipple 6.

Figure 2:
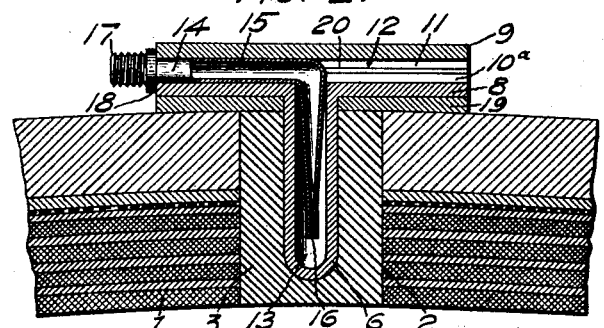
Fig. 2 is a similar view showing the invention in transverse sections.
Figure 3:
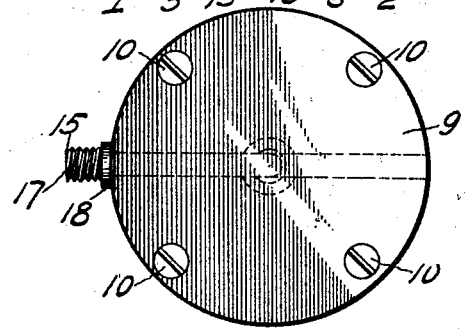
Fig. 3 is a top plan view of the invention.

The bore 13 in the aforesaid nipple 6 is provided for the purpose of introducing a vulcanizing medium into the nipple, such as steam or hot water, or any other suitable medium. I prefer, in this instance, to utilize steam and to introduce it within the nipple or shank in the form of a jet. To this end I provide an angulated nozzle 14 of substantially the injector type, which is designed to be partly contained within the channels $10^a$ and 11 and partly within the bore 13. The nozzle 14 may also be constructed in any suitable manner but, in this instance, comprises an inlet portion 15, and an outlet portion 16, the latter portion being tapered, as will be seen by reference to Fig. 2. Any suitable means for connecting the nozzle to a source of steam supply may be provided, such, for instance, as the threaded nipple 17. Preferably, a collar 18 is also provided adjacent the nipple 17 in order that the portion 16 of the nozzle may be accurately centered in the bore 13 of the nipple or shank 6. As best shown in Fig. 2, that portion of the nozzle 14, that is contained in the bore 13, is smaller at its largest portion than the bore in order that the steam may exhaust into the free portion of the bore provided by the channels 10 and 11 and from there into the atmosphere. Preferably, although not necessarily, I interpose a washer 19 between the head member 5 and the casing in order to insulate them one from the other. Also, I prefer to utilize a washer 20 between the members 8 and 9 of the head member 4.

The operation of the device, it is believed, will be obvious from the foregoing and it will also be apparent that by admitting the continuous stream of the heating fluid into the aforesaid nipple, that an ideal medium is provided in the practice of this invention for uniformly distributing the heat necessary to vulcanization throughout the plug. After the vulcanization operation has been completed, the device may be readily withdrawn from the plug and the opening left by the nipple 6 may be filled in any suitable manner such, for instance, as by tire putty, cement, or the like.

While I have described my invention in detail and, therefore, utilized certain specific language, it is to be understood that the present disclosure is merely illustrative and is not designed in any way to limit the scope or spirit of the invention unless such limitations are indicated in the claims appended hereto.

What I claim is:

1. The method of closing an opening in a rubber product which comprises inserting a vulcanizable medium within the opening, and heating the vulcanizable medium from the interior thereof.

2. The method of closing an opening in a rubber product which comprises inserting a rubber plug within said opening, and applying heating means internally of said plug.

3. The method of closing an opening in a rubber product which comprises inserting a rubber plug within said opening, causing said plug to firmly engage the walls of said opening, and so heating the plug that heat is diffused from the interior central portion of the latter toward the engaging walls of the opening.

4. The method of closing an opening in a rubber product which comprises inserting a rubber plug within said opening, inserting a heating element within the plug, and energizing said element.

5. The method of closing an opening in a rubber product which comprises inserting a rubber plug within said opening, and heating said plug from the central portion thereof.

6. The method of closing an opening in a rubber product which comprises inserting a rubber plug within said opening, and heating said plug so as to cause the temperature to be uniform over the entire surface of the plug in engagement with the walls of the opening.

In witness whereof I have hereunto signed my name.

RICHARD S. BURDETTE.